US012579923B2

(12) United States Patent
Lam

(10) Patent No.: US 12,579,923 B2
(45) Date of Patent: Mar. 17, 2026

(54) METHOD TO IMPLEMENT GLOBAL DIMMING FOR MICROLED DISPLAY

(71) Applicant: OMNIVISION TECHNOLOGIES, INC., Santa Clara, CA (US)

(72) Inventor: Hing Mo Lam, Santa Clara, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 0 days.

(21) Appl. No.: 18/625,563

(22) Filed: Apr. 3, 2024

(65) Prior Publication Data

US 2025/0316208 A1 Oct. 9, 2025

(51) Int. Cl.

*G09G 3/20* (2006.01)
*G09G 3/32* (2016.01)

(52) U.S. Cl.

CPC ......... *G09G 3/2018* (2013.01); *G09G 3/2003* (2013.01); *G09G 3/2077* (2013.01); *G09G 3/32* (2013.01); *G09G 2320/064* (2013.01); *G09G 2360/18* (2013.01)

(58) Field of Classification Search

CPC .. G09G 3/2003; G09G 3/2018; G09G 3/2077; G09G 3/32; G09G 2320/064; G09G 2360/18
USPC .................................................... 345/691, 76
See application file for complete search history.

(56) References Cited

U.S. PATENT DOCUMENTS

| | | | | |
|---|---|---|---|---|
| 5,731,802 A * | 3/1998 | Aras | G09G 3/2022 | 345/98 |
| 5,912,712 A * | 6/1999 | Doherty | G09G 3/2018 | 348/471 |
| 2016/0118026 A1* | 4/2016 | Loo | G09G 3/3283 | 345/83 |
| 2017/0061867 A1* | 3/2017 | Cok | G09G 3/2022 | |
| 2017/0186356 A1* | 6/2017 | Cok | G09G 3/32 | |
| 2017/0330509 A1* | 11/2017 | Cok | G09G 3/2014 | |
| 2023/0092321 A1* | 3/2023 | Halbritter | G09G 3/3258 | 345/690 |

* cited by examiner

*Primary Examiner* — Jason M Mandeville
(74) *Attorney, Agent, or Firm* — CHRISTENSEN O'CONNOR JOHNSON KINDNESS PLLC

(57) ABSTRACT

A micro-LED display, including a display panel with pixel circuits, wherein each pixel circuit includes at least one LED, a frame buffer configured to store display data of the display panel, a first gate driver configured to select a row of the display panel, a bit plane generator configured to and generate a plurality of bitplanes and write the display data to each pixel circuit in the row of the display panel, wherein each bitplane corresponds to a bit of the display data, where the plurality of bitplanes generates a GPWM signal for each pixel circuit of the display panel, a second gate driver configured to output a DPWM signal to each row of the display panel based on the dimming value, where each pixel circuit of the display panel is configured to merge the GPWM and DPWM signals into an FPWM to adjust a brightness of the pixel circuit.

17 Claims, 17 Drawing Sheets

METHOD TO IMPLEMENT GLOBAL DIMMING FOR MICROLED DISPLAY

BACKGROUND INFORMATION

Field of the Disclosure

This disclosure relates generally to the design of micro-light emitting diode (micro-LED) displays, and in particular, relates to micro-LED displays having global dimming in two resolutions.

Background

Micro-LED displays are widely used in augmented/mixed reality (AR/MR), virtual reality (VR), large video displays, TVs and monitors, automotive displays, mobile phones, smart watches and wearables, tablets, laptops and other applications. The technology for manufacturing micro-LED displays continues to advance at a great pace. For example, demands for micro-LED displays having smaller pixels that are closer together for greater image quality motivate further miniaturization and integration of micro-LEDs in display devices.

Micro-LED screens are made up of micrometer-sized LED lights. These lights are used to directly create color pixels. By having thousands or more LED lights, high-quality images and video may be displayed without the need for backlighting.

In some applications, the micro-LED lights need to be dimmed or otherwise adjusted for brightness and/or luminance. Traditionally, such as in displays with larger pixels, additional circuitry may be added to adjust the brightness and/or luminance of each pixel. However, due to the constantly shrinking size of micro-LEDs, pixel circuit space is limited. Therefore, micro-LED displays having global dimming systems are needed.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1A:
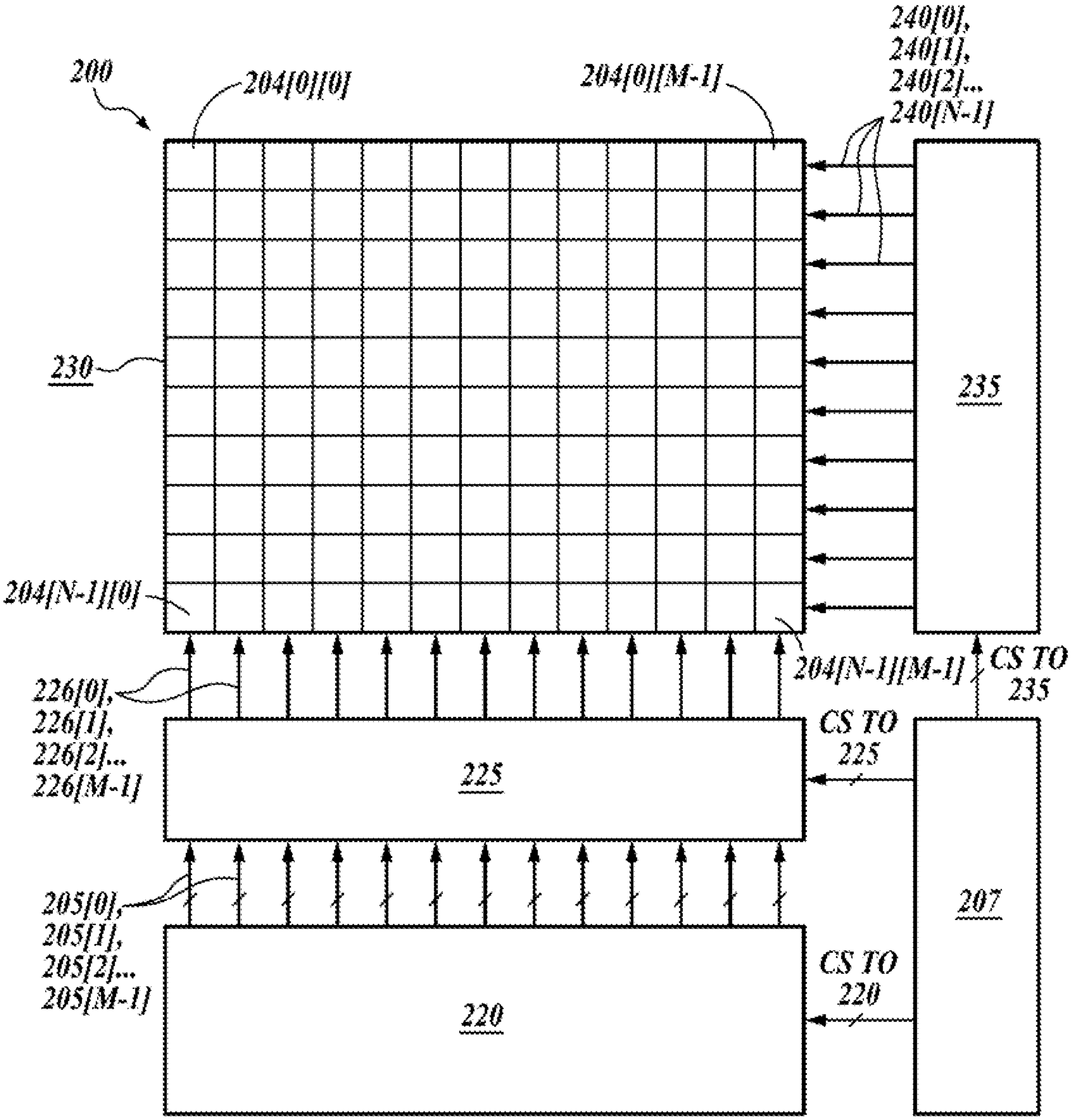
FIG. 1A is an example micro-light emitting diode (micro-LED) display system, in accordance with the present technology.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Micro-LED displays, and in particular, micro-LED displays that include global dimming pixel circuity are disclosed. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Where methods are described, the methods may include more, fewer, or other steps. Additionally, steps may be performed in any suitable order. Accordingly, the disclosure can encompass other embodiments not expressly shown or described herein. In the context of this disclosure, the terms "about," "approximately," etc., mean+/−5% of the stated value.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

Briefly, the embodiments of the present technology are directed to micro-LED displays having global dimming at two resolutions. In some embodiments, the micro-LED display includes a frame buffer, which transmits display data to a bitplane generator. The bitplane generator transmits a first pulse width modulation (PWM) signal at a first resolution to each pixel of the pixel array through a bitline. In some embodiments, a dimming pulse width modulation module (DPWM) transmits a second PWM signal at a second resolution to each row of the pixel array. Each pixel of the pixel array may include pixel circuitry that including an arithmetic module. In some embodiments, the dimming module combines the first PWM signal and the second PWM signal to generate a final pulse width modulation (FPWM) signal. In some embodiments, the FPWM signal controls the brightness and/or luminance of each micro-LED in each pixel of the micro-LED display.

FIG. 1A is an example micro-light emitting diode (micro-LED) display system 200, in accordance with the present technology. The micro-LED display 200 includes a frame buffer 220, a bitplane generator 225, a micro-LED display panel 230, a timing controller 207, and a wordline gate driver 235. The micro-LED display panel 230 includes an N×M array of pixels 204[0][0] . . . 204[N−1][M−1]. In the illustrated example, indices n, m correspond to the row and column of pixel circuit in the array of pixel circuits. For the array of pixel circuits N×M, these indices range from 0 to N−1 for the index n, and from 0 to M−1 for the index m.

Each column 204[0][m] . . . 204[N−1][m] of pixels 204 includes a corresponding data line 226[*m*] (also referred to herein as a bitline). Each row 204[*n*][0] . . . 204[*n*][M−1] of pixels 204 includes a corresponding scan line 240[*n*] (also referred to herein as a wordline).

The timing controller 207 is configured to transmit control signals (CS) to the frame buffer 220, the bitplane generator 225, and the wordline gate driver 235. The frame buffer 220 receives and stores display data.

In display operation, the frame buffer 220 then transmits display data 205[0] . . . 205[M−1] to the bitplane generator 225 row by row. In some embodiments the display data of each pixel is an 8-bit binary number; however, it will be appreciated that the display data can be a 10-bit binary number or a binary number of any other suitable bit width. The frame buffer 220 may be a static random-access memory (SRAM), dynamic random-access memory (DRAM), or other type of storage element. The frame buffer 220 may transmit data representing all of the pixels 204[0][0] . . . 204[N−1][M−1] in a complete display panel 230.

The bitplane generator 225 converts display data into an image signal or video signal that can be displayed on a monitor, screen, or other display. The bitplane generator 225 receives the display data 205[0] . . . 205[M−1] from the frame buffer 220. The display data 205[0] . . . 205[M−1] is a gray level of each pixel on the display panel 230. The gray level directs the bitplane generator 225 to adjust the luminance of one or more LEDs of each pixel 204 in the display panel 230. The bitplane generator 225 is configured to generate bitplanes, such as shown in FIG. 1D. All the generated bitplanes in a period of one frame form a pulse width modulation (PWM) of all pixels 204 on the display panel 230.

Conventionally, each micro-LED in micro-LED display 200 requires an optimal current to drive, for maximum (quantum) efficiency. The display 200 includes a constant current source to generate the optimal current, then uses PWM, such as the GPWM signal generated by the bitplane generator 225, to control the brightness of 8-bit grayscales of the display data 205[0] . . . 205[M−1].

In order to display an image or video, the bitplane generator 225 sequentially reads out all rows of data (such as 1024 rows) from the frame buffer 220 and switches all bitlines 226[0] . . . 226[M−1] to sequentially write bitplane data onto each row of the pixel array. Conventionally, there is not enough time to switch the bitlines 226[0] . . . 226[M−1] fast enough to accommodate 10-bit dimming after adjusting the luminance of 8-bit grayscale with the bitplane generator 225, because of the impedance of the bitlines 226[0] . . . 226[M−1]. This becomes even more difficult for higher resolution and higher frame rate displays. Switching the bitline 226[0] . . . 226[M−1] also consumes large amounts of power.

In operation, the frame buffer 220 provides display data to the bitplane generator 225. The wordlines 240[0] . . . 240[N−1] select a row of pixels 204[0][0] . . . 204[N−1][M−1] for the bitlines 226[0] . . . 226[M−1] to write to. In some embodiments, the bitplane generator 225 outputs a binary 8-bit grayscale pulse width modulation (GPWM) signal for each pixel on the micro-LED display panel 230 through multiple bitplanes, as shown in FIG. 1D. In this manner, each pixel 204 of the micro-LED display panel 230 is turned on or off according to its value on the bitplane, and the luminance of 8-bit grayscale of each pixel is adjusted.

The full display operation is as follows. The timing controller 207 controls the overall display operation of the display system 200. The timing controller also may control when and what data is going to be written into the pixel circuits 204. The timing controller 207 outputs control signals CS (row address, row address enable, clock) to the wordline gate driver 235, the wordline gate driver 235 turns on (or enables) a row of pixel circuits 204[*n*][0] . . . 204[*n*][M−1] via scan lines (or wordlines) 240[0] . . . 240[N−1] for writing in display data on the data lines 226[0] . . . 226[M−1]. At the same time, the timing controller 207 also outputs control signals CS (clock, output enable) to the bitplane generator 225 (or source driver if the display panel 230 is analog driven) to output display data to the data lines 226[0] . . . 226[M−1]. The gray scale (or display data) on the data lines 226[0] . . . 226[M−1] is written into the pixel circuits 204[0][0] . . . 204[N−1][M−1] selected by the scan lines 240[0] . . . 240[N−1]. The gate driver 235 turns off (or disables) the row of pixel circuits 204[0][0] . . . 204[N−1][M−1] after writing the bitplane data into the selected row of pixel circuits 204[0][0] . . . 204[N−1][M−1] is finished, and before removing the bitplane data on the data lines 226[0] . . . 226[M−1]. The process is repeated for the next row of pixel circuits till the last row of pixel circuits of the display panel 230.

Figure 1B:
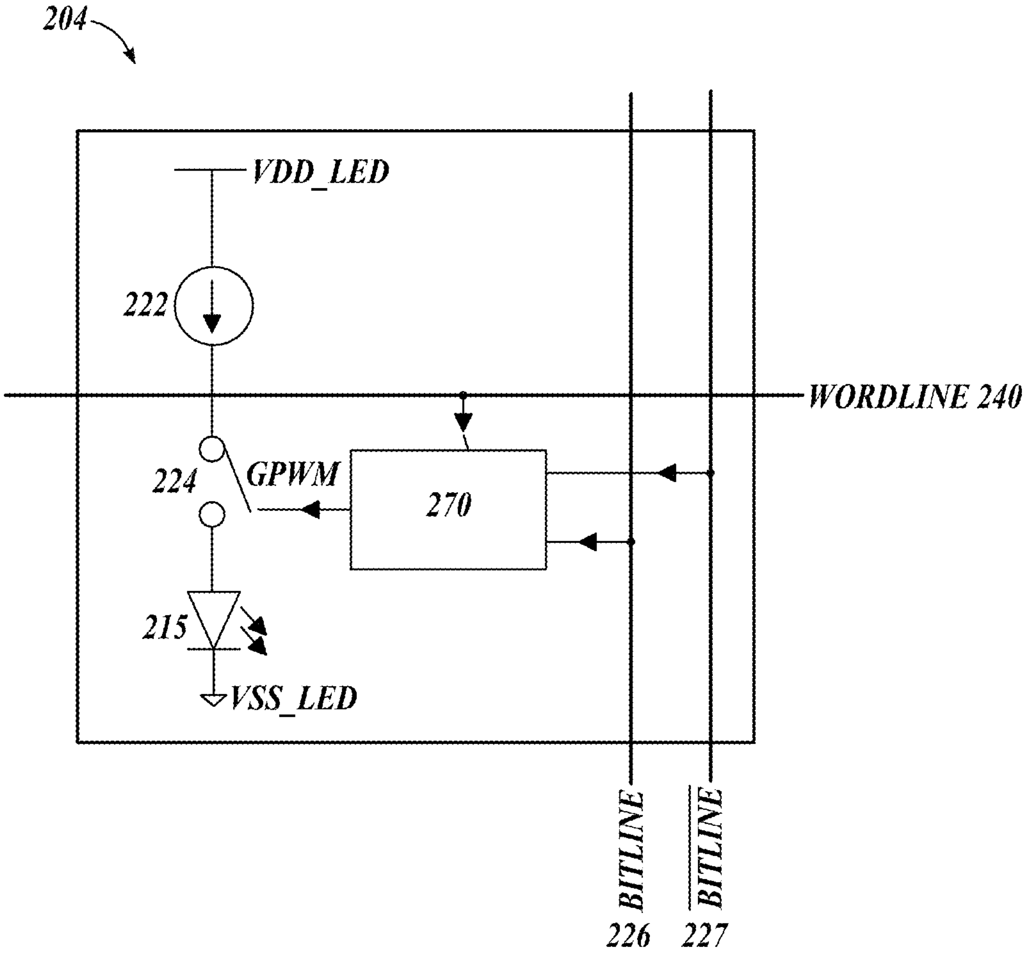
FIGS. 1B-1C are example pixel circuits of the display panel of FIG. 1A.
Figure 1C:
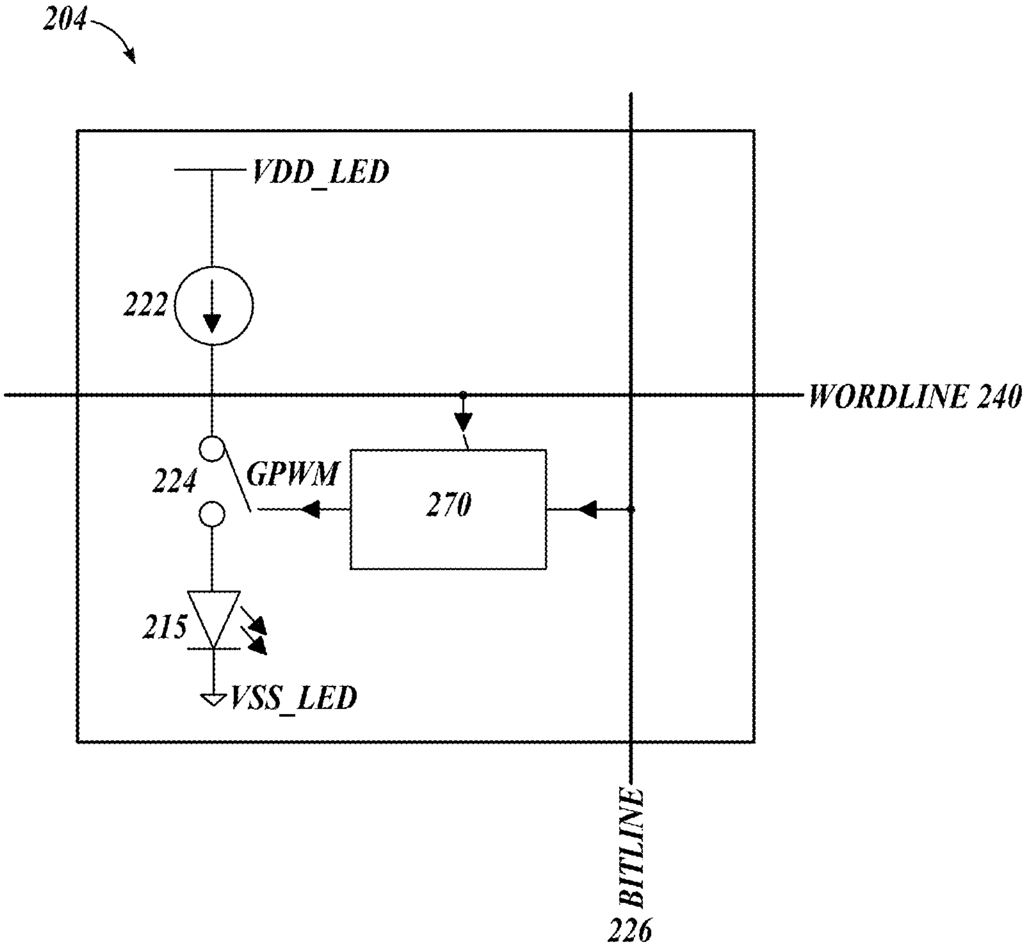
Figure 1D:
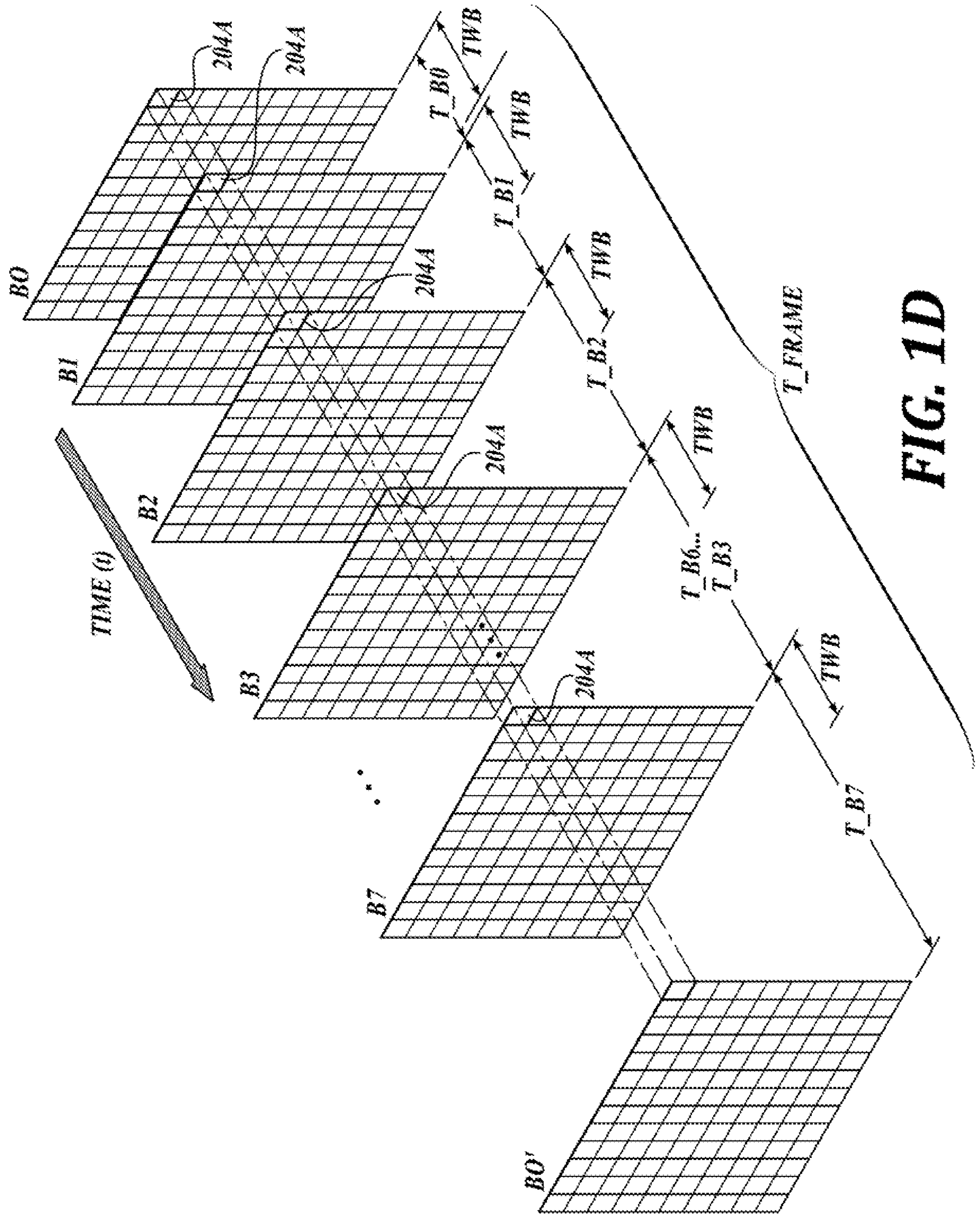
FIG. 1D is a representational diagram of bitplanes generated by the bitplane generator of FIG. 1A.

FIGS. 1B-1C are example pixel circuits 204 of the display panel 230 of FIG. 1A. The pixel circuit 204 includes a current source 222, a micro-light emitting diode (LED) 215, a switch 224, a 1-bit storage element 270, a wordline 240, and a bitline 226. In some examples, the 1-bit storage element 270 is coupled with the bitline 226, the wordline 240, and the bitline_bar 227. In some examples, such as in FIG. 1C, the bitline_bar 227 is omitted.

In operation, the wordline 240 selects a row of pixel circuits, including pixel circuit 204. The bitline 226 and/or the bitline_bar 227 writes display data to the pixel circuit 204. The bitline 226 and/or the bitline_bar 227 facilitate display data writing to the 1-bit storage element 270. The constant current source 222 generates an optimal current, then uses the GPWM generated by the bitplane generator 225 and written to the pixel circuit 204 with the bitline 226 and bitline_bar 227, to control the brightness of 8-bit gray-scales of the display data 205A, 205B, 205C . . . 205N.

The writing of GPWM data into pixel circuit is on a row-by-row basis. GPWM data will temporarily be stored in 1-bit storage element 270 in each pixel circuit 204. Because of this 1-bit storage element 270, the GPWM of each pixel can be different for each pixel circuit 240. The 1-bit storage element 270 outputs the gray pulse width modulation (GPWM) signal to the micro-LED 215.

FIG. 1D is a representational diagram of bitplanes B0, B1, B2, B3 . . . B7, B0' generated by the bitplane generator 225 of FIG. 1A. The bitplane generator (such as bitplane generator 225) generates a number of bitplanes B0, B1, B2, B3 . . . B7, B0' over time (t). The number of bitplanes B0, B1, B2, B3 . . . B7, B0' in FIG. 1D is an arbitrary number of bitplanes. The number of bitplanes B0, B1, B2, B3 . . . B7, B0' depends on the PWM generation scheme implemented in the display panel. For example, for binary PWM of 8-bit display data, there will be 8 bitplanes. Each bitplane B0, B1, B2, B3 . . . B7, corresponds with 1 bit of display data. B0' is the first bitplane of the next 8-bit display data.

At an initial time, a first bitplane B0 is generated. Each bitplane B0, B1, B2, B3 . . . B7, B0' is generated for the entire display panel (such as display panel 230 in FIG. 1A). For clarity, a single pixel circuit 204A is enumerated, but it should be understood that each bitplane B0, B1, B2, B3 . . . B7, B0' includes every pixel in the display panel.

At each time interval T_B0, T_B1, T_B2, T_B3 . . . T_B6, T_B7 a respective bitplane B0, B1, B2, B3 . . . B7 is generated. Each bitplane B0, B1, B2, B3 . . . B7 contains 1 bit of GPWM data of all the pixels in the display panel. For each bitplane B0, B1, B2, B3 . . . B7 there is a time period to move the bitplane data from the bitplane generator (such as bitplane generator 225) to the pixel circuits on the display panel row-by-row (TWB). In some embodiments, the GPWM data 227 is binary. So, for an 8-bit GPWM signal, eight bitplanes B0, B1, B2, B3 . . . B7 are generated. One skilled in the art should understand that the ellipses illustrate additional bitplanes that are not illustrated for clarity and simplicity.

Figure 1E:
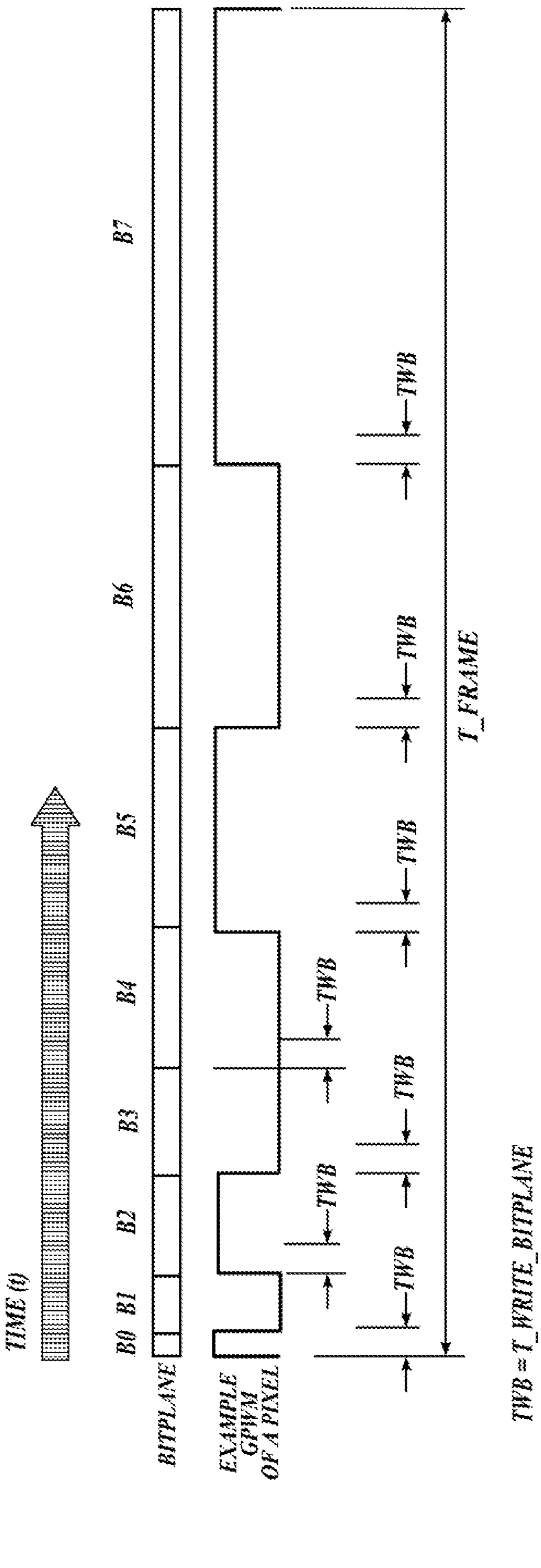
FIG. 1E is a graph of an example output of the bitplane generator 225 of FIG. 1A.

FIG. 1E is a graph of an example output of the bitplane generator 225 of FIG. 1A. In FIG. 1A, example display data for a single pixel (such as pixel 204) in the display panel (such as display panel 230) is 8'b1010_0101. As shown in FIGS. 1D and 1E, each bitplane B0, B1, B2, B3, B4, B5, B6, B7 represents a single bit of the display data 8'b1010_0101. It should be understood by one skilled in the art that while only the display data for a single pixel is shown in 1E, each bitplane B0, B1, B2, B3, B4, B5, B6, B7 includes every pixel in the display panel.

Over time (t), each bitplane B0, B1, B2, B3, B4, B5, B6, B7 transmits display data to the pixel circuit. The time for writing each bitplane B0, B1, B2, B3, B4, B5, B6, B7 is also shown (TWB or T_WRITE_BITPLANE). Accordingly, a first bitplane B0 transmits an ON or "1" signal, while the next bitplane B1 transmits an OFF or "0" signal. In this manner, the gray value of the pixel for each bit of the 8-bit display data may be transmitted within a frame T_FRAME of the display panel. The time frame T_FRAME may be the amount of time needed for the entire 8-bit display data (in the form of a bitplane) to be read to every pixel of the micro-LED display. In this manner, a GPWM signal is transmitted to each pixel, which adjusts a gray value of the pixel for each frame T_FRAME. As shown in FIG. 1E, the GPWM is an example GPWM of a single pixel (such as pixel 206A in FIG. 1D).

Figure 1F:
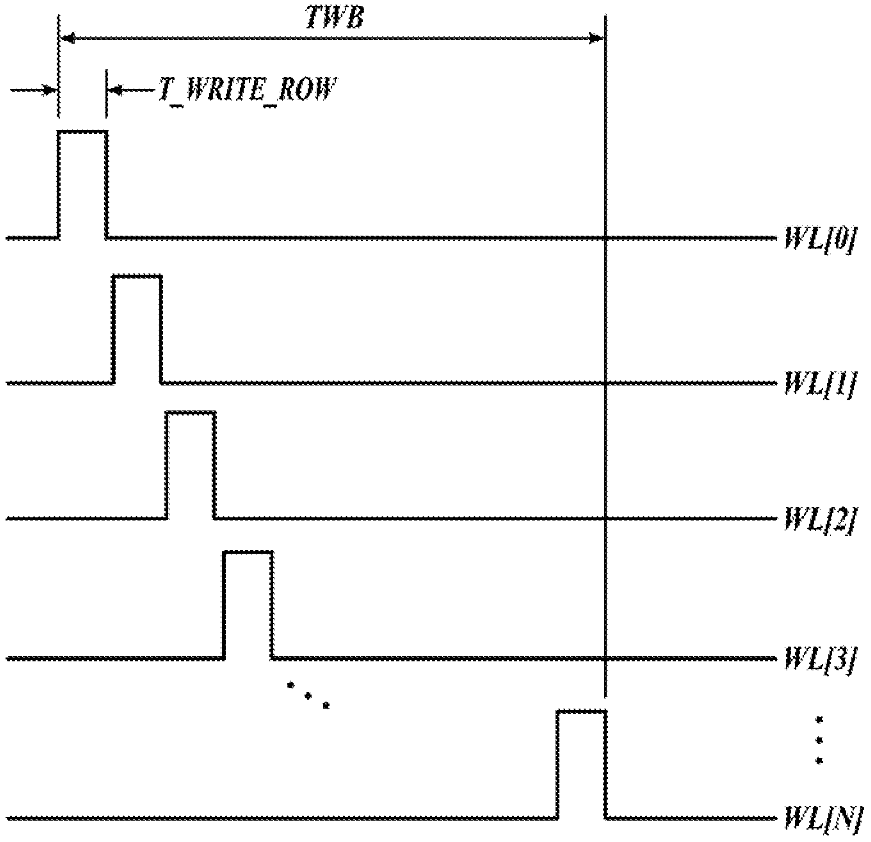
FIG. 1F is a timing diagram of an example signal from a scan line when writing bitplane data into each pixel circuit row by row.

FIG. 1F is a timing diagram of an example signal from a scan line when writing bitplane data into each pixel circuit row by row. It should be understood that the time for writing a bitplane TWB is the same as is illustrated in FIGS. 1D and 1E. The time for writing each row of the display panel is also illustrated (T_WRITE_ROW). The wordlines (WL) for each row of the display panel are also shown.

In order to write each bitplane, a wordline (such as WL[0]) selects a row of the display panel. The scan lines transmit display data (in the form of a bitplane) to each pixel in the selected row, as shown by the enable signal, over T_WRITE_ROW. Then, the next word line (such as WL[1]) selects the next row of the display panel. The scan lines transmit display data to each pixel in the next row. This is done for every row in the display panel, resulting in a bitplane.

Figure 2A:
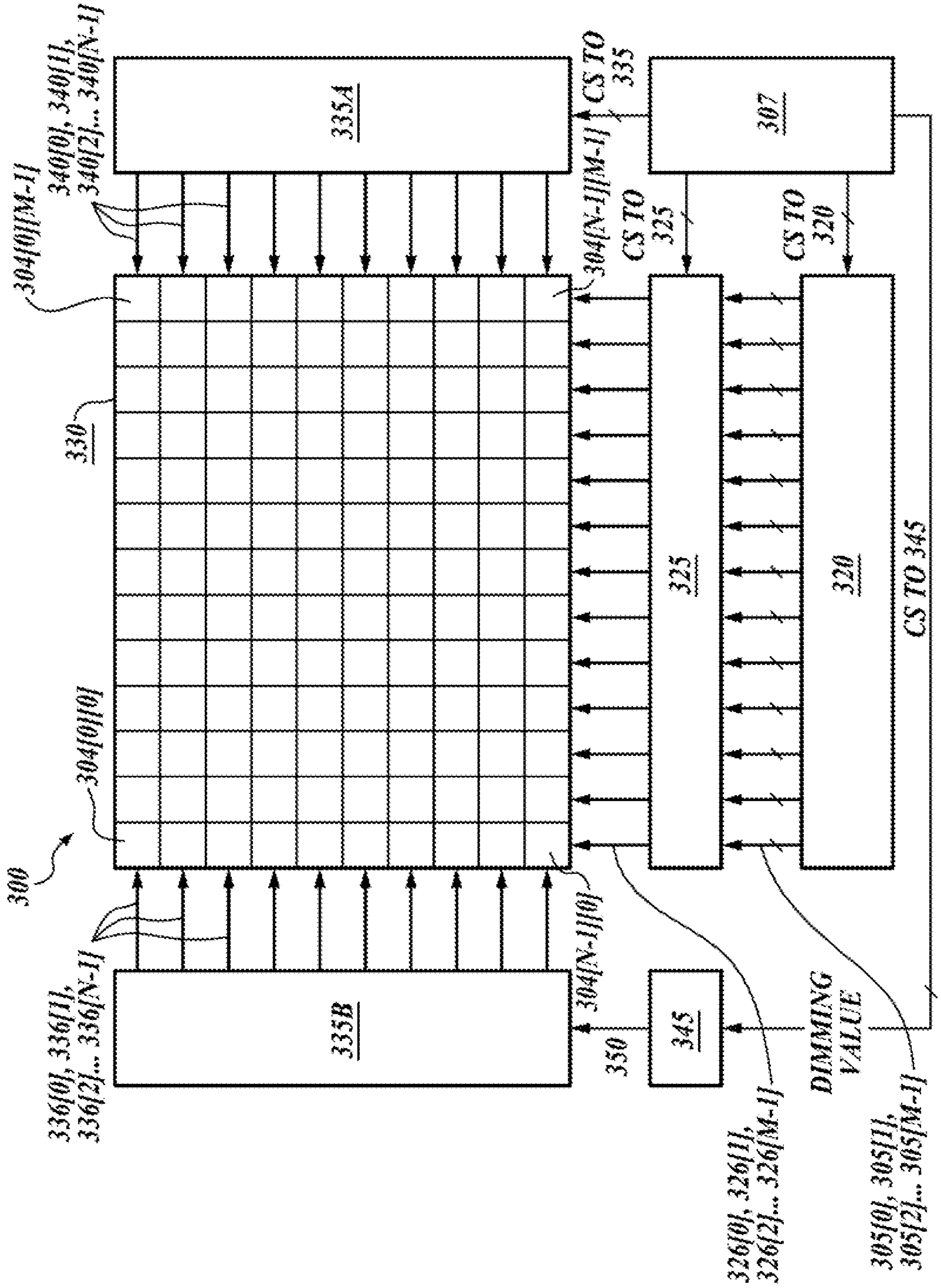
FIG. 2A is a block diagram of a micro-LED display, in accordance with the present technology.

FIG. 2A is a block diagram of a micro-LED display 300, in accordance with the present technology. The micro-LED display 300 includes a frame buffer 320, a bitplane generator 325, a micro-LED display panel 330, a timing controller 307, and a wordline gate driver 335A. The micro-LED display panel 330 includes an array of pixels 304[0][0], 304[0][M−1], 304[N−1][0] . . . 304[N−1][M−1]. Each column of the pixel circuit 330 includes a data line (also referred to herein as a bitline) 326[0], 326[1], 326[2] . . . 326[M−1]. Each row of the pixel circuit 330 includes a first scan line (also referred to herein as a wordline) 340[0], 340[1], 340[2] . . . 340[N−1]. The micro-LED display 300 further includes a dimming controller 345 and a second gate driver 335B. The second gate driver 335B includes second scanlines 336[0], 336[1], 336[2] . . . 336[M−1] for each row of the pixel circuit 330.

The timing controller 307 is configured to transmit control signals (CS) to the frame buffer 320, the bitplane generator 325, the wordline gate driver 335, and the dimming controller 345.

The frame buffer 320 receives and stores display data. In display operation, the frame buffer 320 then transmits display data (or 8-bit data) 305[0], 305[1], 305[2] . . . 305[M−1] to the bitplane generator 325 row by row. The frame buffer 320 may be a static random-access memory (SRAM), dynamic random-access memory (DRAM), or other type of storage element. The frame buffer 320 may transmit data representing all of the pixels 304[0][0], 304[0][M−1], 304[N−1][0] . . . 304[N−1][M−1] in a complete display panel 330.

The bitplane generator 325 converts display data into an image signal or video signal that can be displayed on a monitor, screen, or other display. The bitplane generator 325 receives the display data 305[0], 305[1], 305[2] . . . 305[M−1] from the frame buffer 320. The display data 305[0], 305[1], 305[2] . . . 305[M−1] is a gray level of each pixel on the display panel 330. The gray level directs the bitplane generator 325 to adjust the luminance of one or more LEDs of each pixel 304[0][0], 304[0][M−1], 304[N−1][0] . . . 304[N−1][M−1] in the display panel 330. The bitplane generator 325 is configured to generate bitplanes, such as shown in FIG. 1D. All the generated bitplanes in a period of one frame form a pulse width modulation (PWM) of all pixels 304[0][0], 304[0][M−1], 304[N−1][0] . . . 304[N−1][M−1] on the display panel 330.

In order to display an image or video, the bitplane generator 325 sequentially reads out all rows of data (such as 1024 rows) from the frame buffer 320 and switches all bitlines 326[0], 326[1], 326[2] . . . 326[M−1] to sequentially write bitplane data onto each row of the pixel circuit 300.

In operation, the frame buffer 320 provides display data to the bitplane generator 325. The wordlines 340[0], 340[1], 340[2] . . . 340[N−1] select a row of pixel 304A, 304B, 304C . . . 304N for the bitlines 326[0], 326[1], 326[2] . . . 326[N−1] to write to. In some embodiments, the bitplane generator 325 outputs a binary 8-bit grayscale pulse width modulation (GPWM) signal for each pixel on the micro-LED display panel 330 through multiple bitplanes. In this manner, each pixel 304[0][0], 304[0][M−1], 304[N−1][0] . . . 304[N−1][M−1] of the micro-LED display panel 330 is turned on or off according to its value on the bitplane, and the luminance of 8-bit grayscale of each pixel is adjusted.

At the same time, the timing controller 307 outputs a dimming value to the dimming controller 345. The dimming controller 345 outputs a dimming pulse width modulation (DPWM) 350 for the entire display panel 330. In some embodiments, the DPWM 350 is transmitted to the second gate driver 335B. The second gate driver 335B writes the DPWM to each pixel 304[0][0], 304[0][M−1], 304[N−1][0] . . . 304[N−1][M−1] of the display panel 330 row by row through the second scan lines 336[0], 336[1], 336[2] . . . 336[M−1].

The full display operation is as follows. The timing controller 307 controls the overall display operation of the display system 300. The timing controller 307 also may control when and what data is going to be written into the pixel circuits 304[0][0], 304[0][M−1], 304[N−1][0] . . . 304[N−1][M−1]. The timing controller 307 outputs control signals CS (row address, row address enable, clock) to the wordline gate driver 335A, the wordline gate driver 335A turns on (or enables) a row of pixel circuits 304[0][0], 304[0][M−1], 304[N−1][0] . . . 304[N−1][M−1] via scan lines (or wordlines) 340[0], 340[1], 340[2] . . . 340[N−1] for writing in display data on the data lines 326[0], 326[1], 326[2] . . . 326[M−1].

At the same time, the timing controller 307 also outputs control signals CS (clock, output enable) to the bitplane generator 325 to output display data to the data lines 326[0], 326[1], 326[2] . . . 326[M−1]. The gray scale (or display data) on the data lines 326[0], 326[1], 326[2] . . . 326[M−1] is written into the pixel circuits 304[0][0], 304[0][M−1], 304[N−1][0] . . . 304[N−1][M−1] selected by the scan lines 340[0], 340[1], 340[2] . . . 340[N−1]. The gate driver 335A turns off (or disables) the row of pixel circuits 304[0][0], 304[0][M−1], 304[N−1][0] . . . 304[N−1][M−1] after writing the display data into the selected row of pixel circuits 304[0][0], 304[0][M−1], 304[N−1][0] . . . 304[N−1][M−1] is finished, and before removing the grayscale (or display data) on the data line 326[M−1]. The is repeated for the next row of pixel circuits till the last row of pixel circuits of the display panel 330.

At the same time, the timing controller 307 also outputs a dimming value to the dimming controller 345. The dimming controller outputs the DPWM signal to the second gate driver 335B. Each second scan line 326[0], 326[1], 326[2] . . . 326[M−1] passes the DPWM to each pixel 304[0][0], 304[0][M−1], 304[N−1][0] . . . 304[N−1][M−1] of the display panel 330 row-by-row.

Figure 2B:
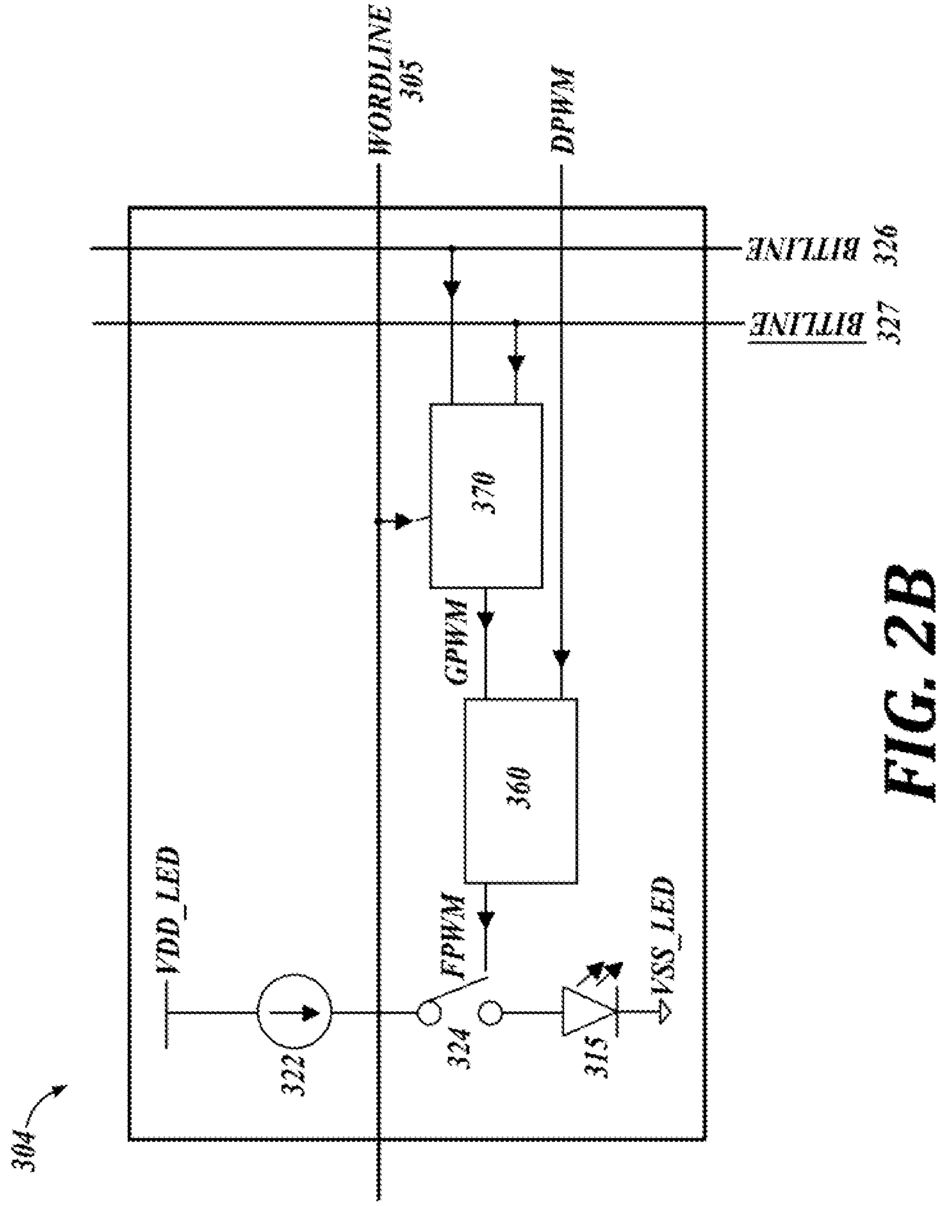
FIGS. 2B-2C are example pixel circuits 304 of the display panel 330 of FIG. 2A.
Figure 2C:
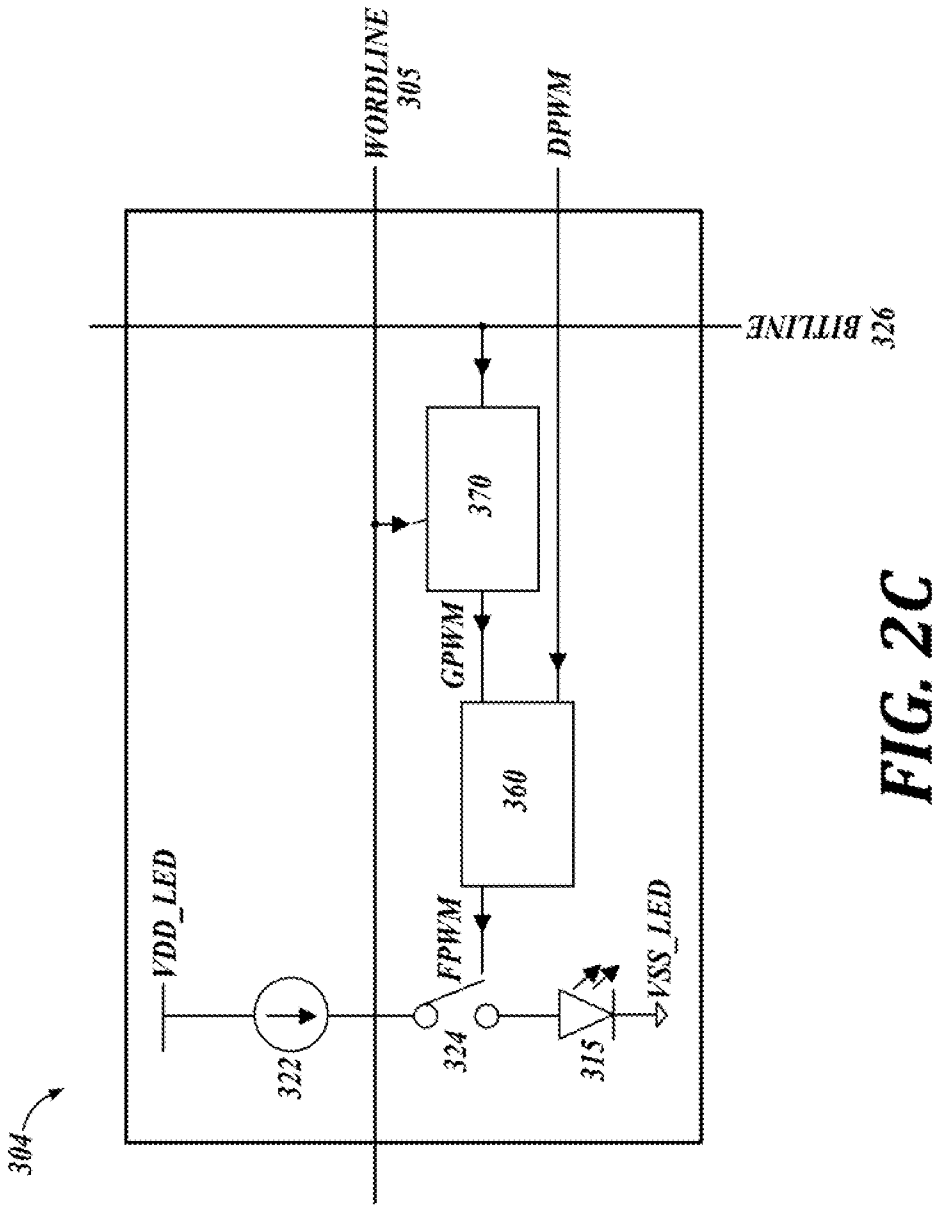
Figure 2D:
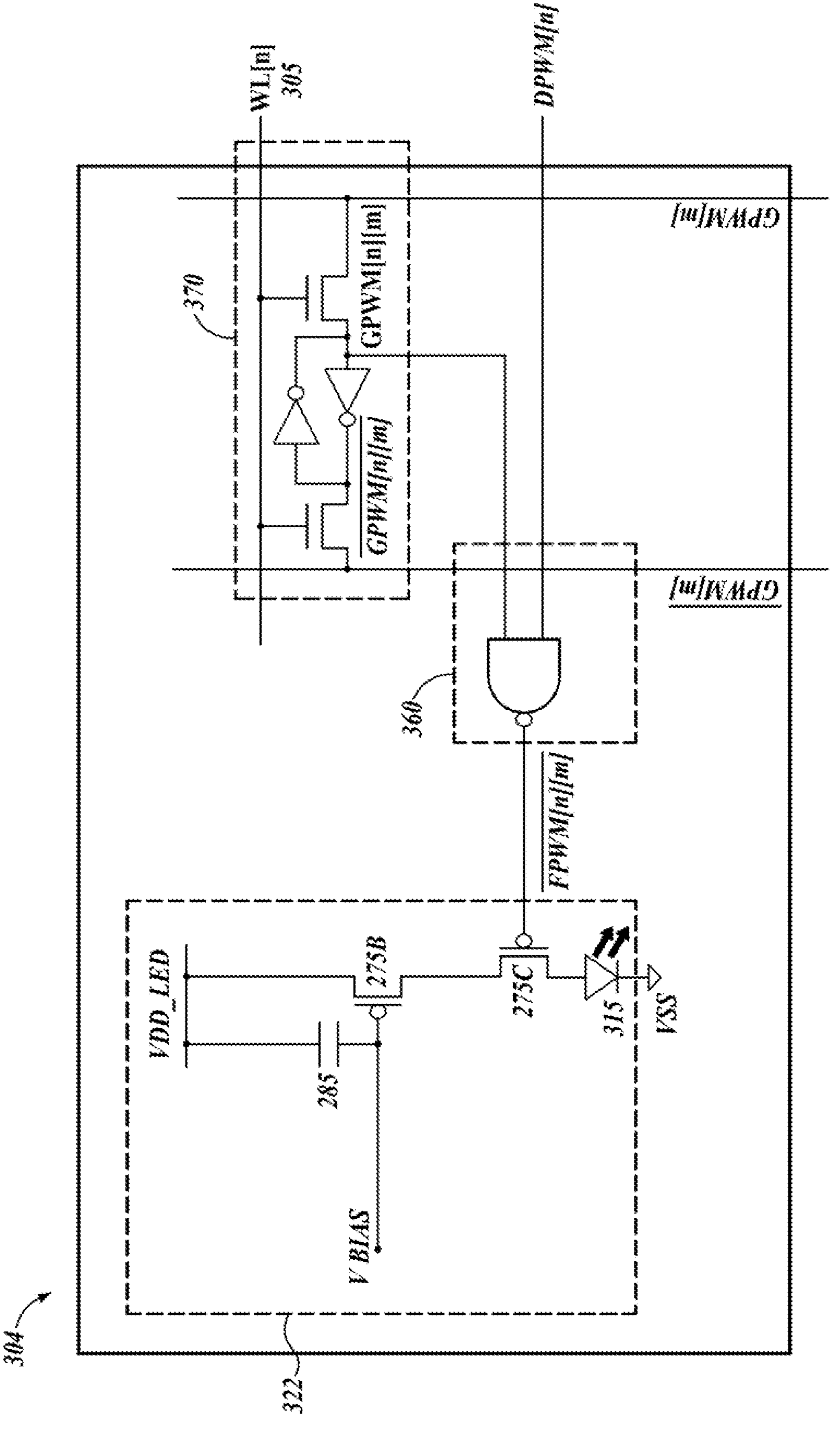
FIG. 2D is another example pixel circuit 304 of the micro-LED display panel of FIG. 2A, in accordance with the present technology.

As shown in FIGS. 2B-2D, a dimming module in each pixel circuit combines the DPWM signal from the second gate driver 335B and the GPWM signal from the bitplane generator 325 into a final pulse width modulation (FPWM) signal. The FPWM signal then controls the brightness of each pixel 304[0][0], 304[0][M−1], 304[N−1][0] . . . 304[N−1][M−1] of the display panel 330.

FIGS. 2B-2C are example pixel circuits 304 of the display panel 330 of FIG. 2A. The pixel circuit 304 includes a current source 322, a micro-LED 315, a switch 324, a 1-bit storage element 370, a wordline 340, and a bitline 326. In some examples, the 1-bit storage element 370 is coupled with the bitline 326, the wordline 340, and the bitline_bar 327. In some examples, such as in FIG. 2C, the bitline_bar 327 is omitted.

In operation, the wordline 340 selects a row of pixel circuits, including pixel circuit 304. In some embodiments, the bitline 326 and the bitline_bar 327 (as shown in FIG. 2B) writes display data to the pixel circuit 304. The bitline 326 and the bitline_bar 327 write display data to the 1-bit storage element 370.

The writing of GPWM data into pixel circuit is on a row-by-row basis. GPWM data will temporarily be stored in 1-bit storage element 370 in each pixel circuit 304. Because of this 1-bit storage element 370, the GPWM of each pixel can be different for each pixel circuit 340.

The DPWM does not need to write to the pixel circuit 304 and may not be stored inside pixel circuit 304 because each row of pixel circuits shares the same DPWM signal.

In some embodiments, the 1-bit storage element 370 outputs the GPWM signal to the dimming module 360. In some embodiments, the dimming module 360 also receives the DPWM from a second gate driver (such as second gate driver 335B). In some embodiments, the DPWM signal is a 10-bit signal. In some embodiments, the DPWM signal is a global dimming signal, that is, for every pixel in the display panel. In some embodiments, the DPWM signal is a square wave pulse. In some embodiments, the dimming module adds or otherwise combines the GPWM signal and the DPWM signal to generate an FPWM signal.

The constant current source 322 generates an optimal current, then uses the FPWM signal to control the brightness of the pixel circuit 304.

FIG. 2D is another example pixel circuit 304 of the micro-LED display panel of FIG. 2A. In some embodiments, the pixel circuit 304 includes a constant current source 322. In some embodiments, the current source 322 includes a capacitor 285, a first transistor 275B and a second transistor 275C. In some embodiments, the pixel circuit 304 also includes a dimming module 360. In some embodiments, the dimming module 360 includes arithmetic logic, such as an AND or NAND gate. The dimming module 360 may output an FPWM signal. In some embodiments, the FPWM signal is a combination of the DPWM signal from the second gate driver and the GPWM signal from the storage element 370.

Figure 2E:
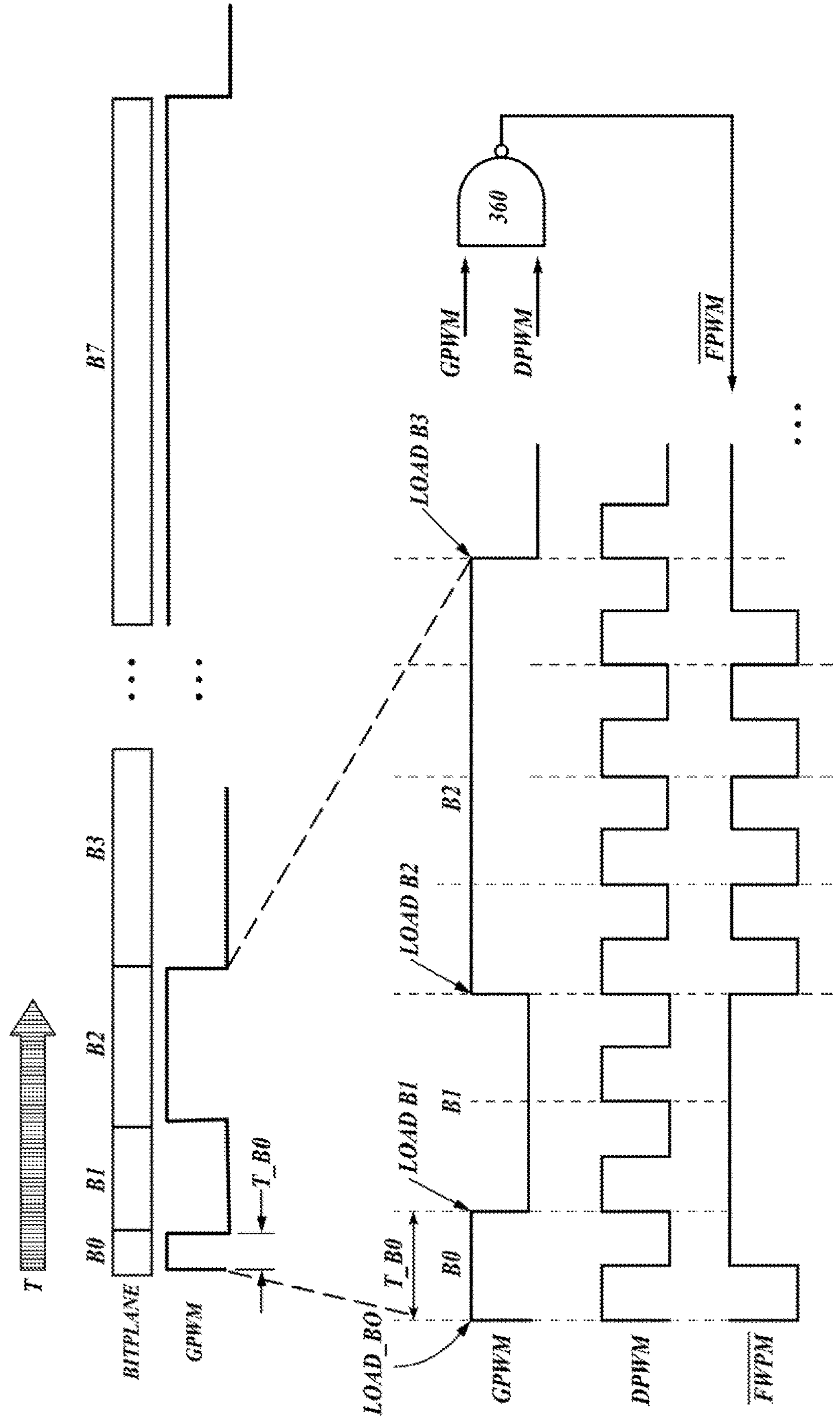
FIG. 2E is a portion of an FPWM signal of the dimming module 360 of FIG. 2D, in accordance with the present technology.

FIG. 2E is a portion of an FPWM signal of the dimming module 360 of FIG. 2D, in accordance with the present technology. In some embodiments, each pixel (such as pixel 304 in FIG. 2A) includes a dimming module 360 (e.g., a logical AND arithmetic module, as shown in FIG. 2D). In some embodiments, the dimming module 360 merges an 8-bit GPWM signal from the bitplane generator with a DPWM signal from the second gate driver. In some embodiments, the DPWM signal is a 10-bit PWM signal.

Example display data for a single pixel (such as pixel 304) in the display panel (such as display panel 330) is 8'b1010_0101. Each bitplane B0, B1, B2, B3 . . . B7 represents a single bit of the display data 8'b1010_0101. It should be understood by one skilled in the art that while only the display data for a single pixel is shown in FIG. 2E, each bitplane B0, B1, B2, B3 . . . B7 includes every pixel in the display panel.

Over time (T), each bitplane B0, B1, B2, B3 . . . B7 transmits display data to the pixel circuit. Each bitplane B0, B1, B2, B3 . . . B7 is loaded during each bit (Load B0, Load B1, Load B2, Load B3). It should be understood that a bitplane is generated for each bit of the 8-bit display data. FIG. 2E is merely a portion of the full 8-bit display data.

A first bitplane B0 transmits an ON or "1" signal, while the next bitplane B1 transmits an OFF or "0" signal. B0, B1 ON or OFF depends on the display data of the pixel. In this pixel display data example, 8'b1010_0101, the B0 (least significant bit) is "1" and is thus "ON." In this manner, the gray value of the pixel for each bit of the 8-bit display data may be transmitted. In this manner, a GPWM signal is transmitted to each pixel, to a dimming module 360 which adjusts a gray value of the pixel.

In some embodiments, the DPWM signal is a series of pulses 350 having a 10-bit resolution. In some embodiments, the DPWM signal 350 has a duty ratio. In some embodiments, the duty ratio is dependent on the dimming value from a timing controller (such as the dimming value in FIG. 2A). The duty ratio of the DPWM may be from 0% to 100% for dimming. The corresponding dimming value may be from 0 to 1023. The cycle time of the DPWM is T_B0. In some embodiments, in the same frame time (T_FRAME) all pixel circuits share the same DPWM, that is a same duty ratio of DPWM signal. If the next frame has a different duty ratio of the DPWM signal, the different DPWM signal will be updated on a row-by-row basis.

In some embodiments, the dimming module 360 is AND-type logic, such as an AND or NAND gate.

As shown in FIG. 2E, when the dimming module 360 combines the GPWM signal with the DPWM signal, the dimming module 360 generates an FPWM signal. In this manner, the micro-LED display system can implement global dimming at two resolutions (both 8-bit resolution and 10-bit resolution). In some embodiments, the micro-LED system can implement both 8-bit binary GPWM dimming and 10-bit DPWM dimming.

Figure 2F:
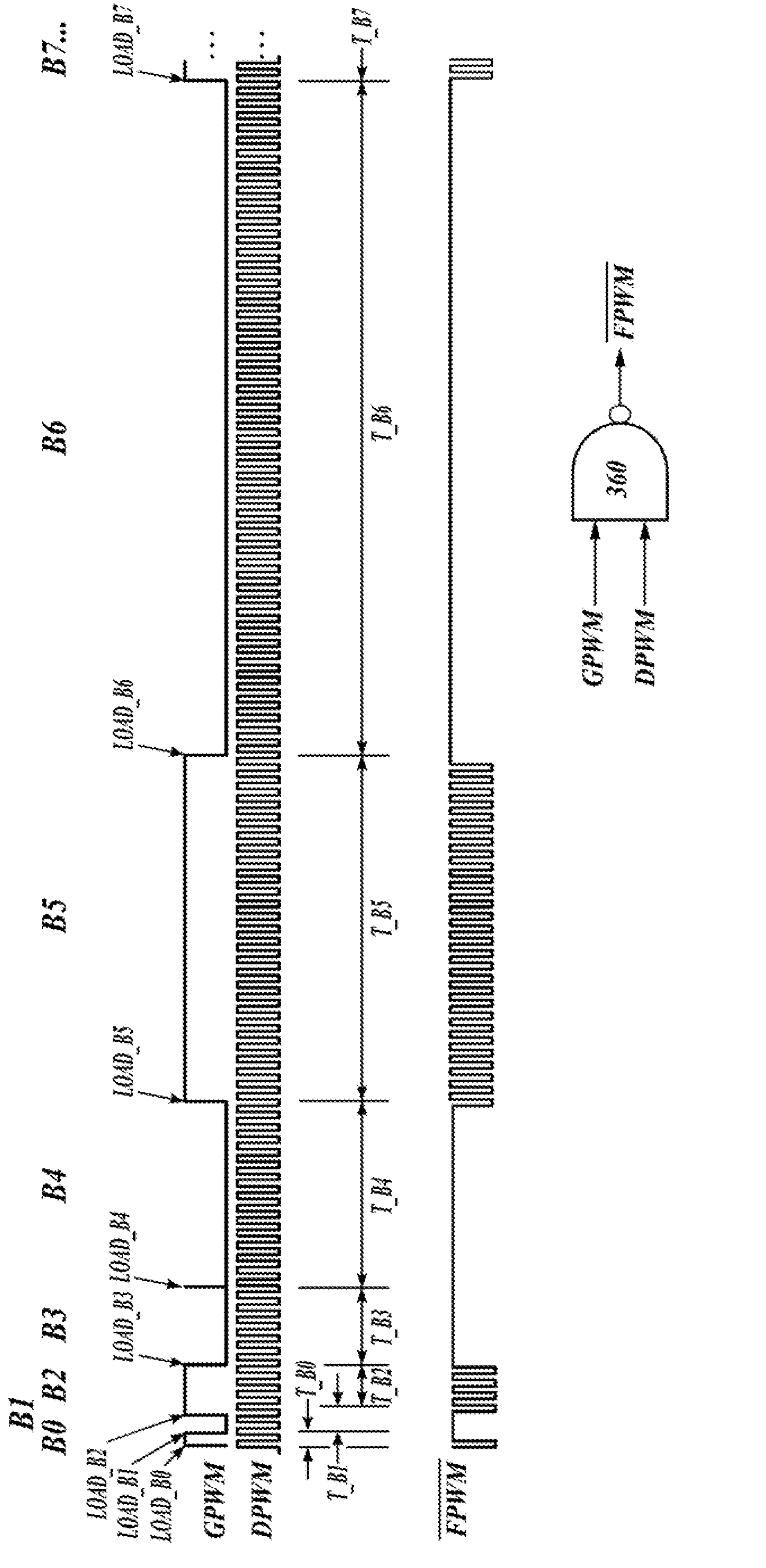
FIG. 2F shows the full FPWM signal of FIG. 2E, in accordance with the present technology.

FIG. 2F shows the full FPWM signal of FIG. 2E, in accordance with the present technology. In some embodiments, the DPWM is the same for each pixel in a row of the display panel. In some embodiments, the DPWM is a 10-bit signal. In some embodiments, the DPWM. A duty cycle for the DPWM is the same for each pixel in a row of the display panel.

In some embodiments, the GPWM is different for each pixel of the display panel. In some embodiments, display data (or gray value date) is 8-bit display data. The bitplane generator generates a bitplane B0, B1, B2, B3, B4, B5, B6, B7 for the entire display panel for each bit of the display data. Each bitplane B0, B1, B2, B3, B4, B5, B6, B7 is generated for each bit (Load_B0, Load_B1, Load_B2, Load_B3, Load_B4, Load_B5, Load_B6, Load_B7).

The dimming module 360 combines the DPWM signal and the GPWM signal to form the FPWM module. The FPWM signal may then control each pixel in the display panel.

Figure 2G:
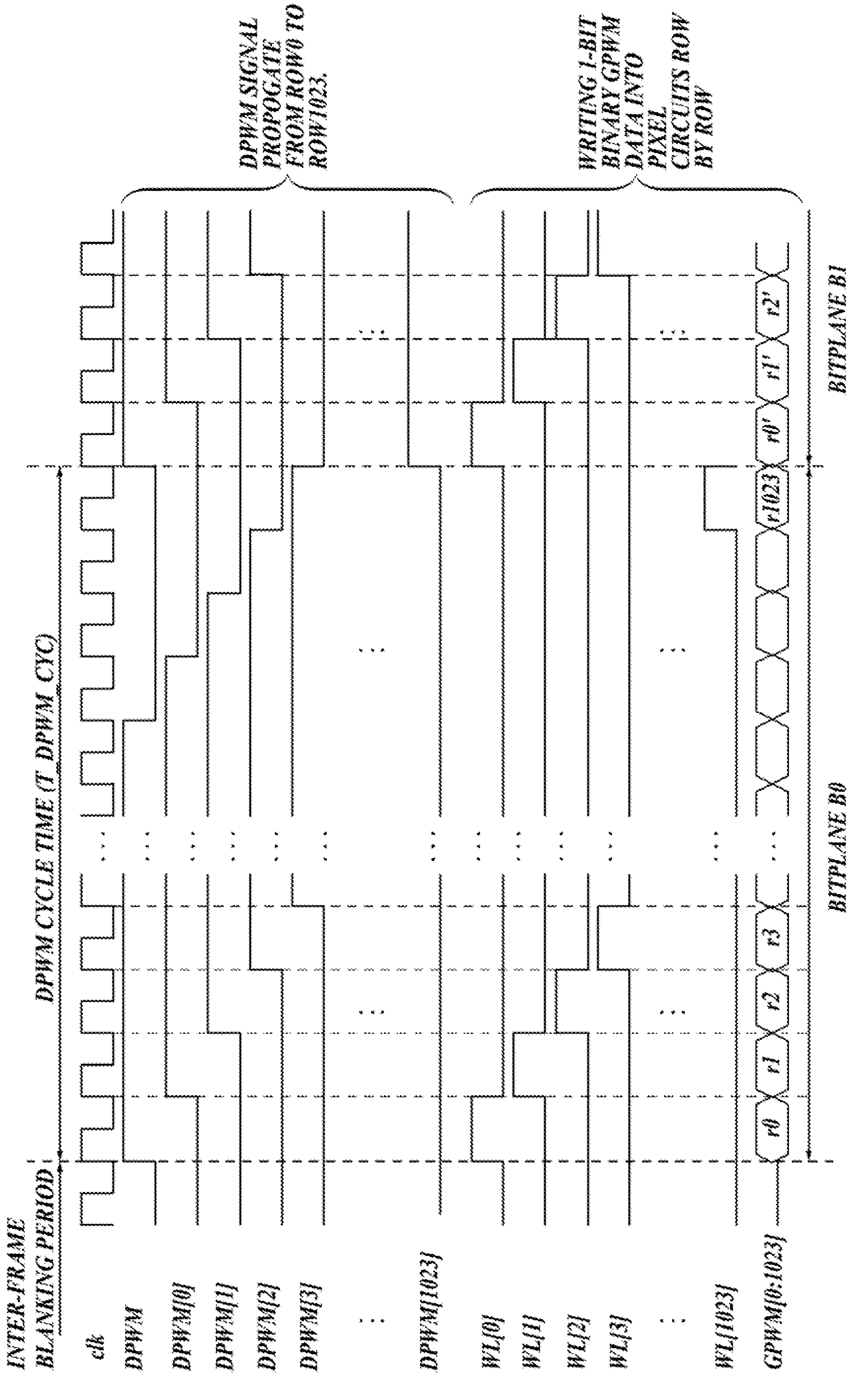
FIG. 2G is a graph of the GPWM signal and the second series of DPWM signal for a bitplane, in accordance with the present technology.

FIG. 2G is a graph of the GPWM signal and the second series of DPWM signal for a bitplane, in accordance with the present technology.

Both the GPWM signal and the DPWM signals may be controlled with a same clock (clk). In some embodiments, the DPWM cycle time (T_DPWM_CYC) corresponds to the time it takes to write a bitplane T_B0 in FIG. 2E.

On the left-hand side of FIG. 2G is the DPWM signal for each row of the display panel. In some embodiments, the display panel has 1024 rows of pixel circuits. Also on the left-hand side of FIG. 2G are the wordlines WL (or first scan lines, such as shown in FIG. 2A). Each row of the display panel has a corresponding wordline. On the bottom left is the GPWM signal for each row of the display panel. As is illustrated, r0 is the row 0 GPWM data, r1 is for row 1, etc.

On the horizontal axis is the bitplane. A first bitplane (or initial bitplane) B0 is shown. A portion of a next bitplane B1 is also shown. In some embodiments, the rows r0 to r1023 form a complete 1-bit GPWM data of the first bitplane B0. In some embodiments, there is idle time after finishing the writing of the initial bitplane B0 before the next bitplane B1 is written to each pixel of the display panel.

As shown in FIG. 2G, the DPWM signal is propagated from row 0 to row 1023. A first bit binary GPWM is written into the pixel circuits row-by-row, contemporaneously.

Figure 3A:
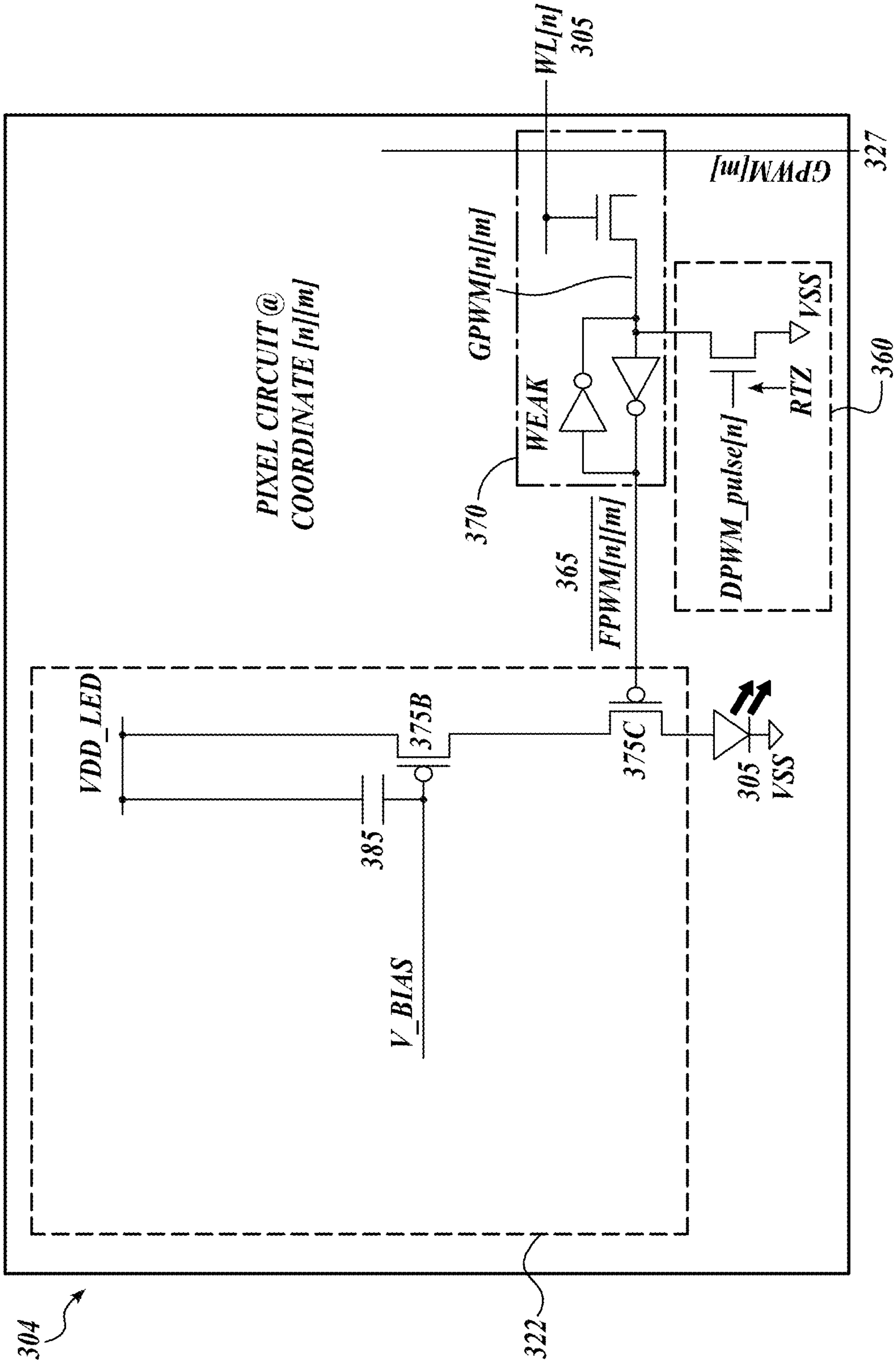
FIG. 3A is another example pixel circuit 304 of the micro-LED display panel of FIG. 2A, in accordance with the present technology.

FIG. 3A is another example pixel circuit 304 of the micro-LED display panel of FIG. 2A. In some embodiments, the pixel circuit 304 includes a constant current source 322. In some embodiments, the current source 322 includes a capacitor 385, a first transistor 375B and a second transistor 375C. In some embodiments, the pixel circuit 304 also includes a dimming module 360. In some embodiments, the dimming module 360 includes arithmetic logic. In some embodiments, the dimming module 360 is a return to zero (RTZ) dimming module. The dimming module 360 may output an FPWM signal. In some embodiments, the FPWM signal is a combination of the DPWM signal from the second gate driver and the GPWM signal from the 1-bit storage element.

Figure 3B:
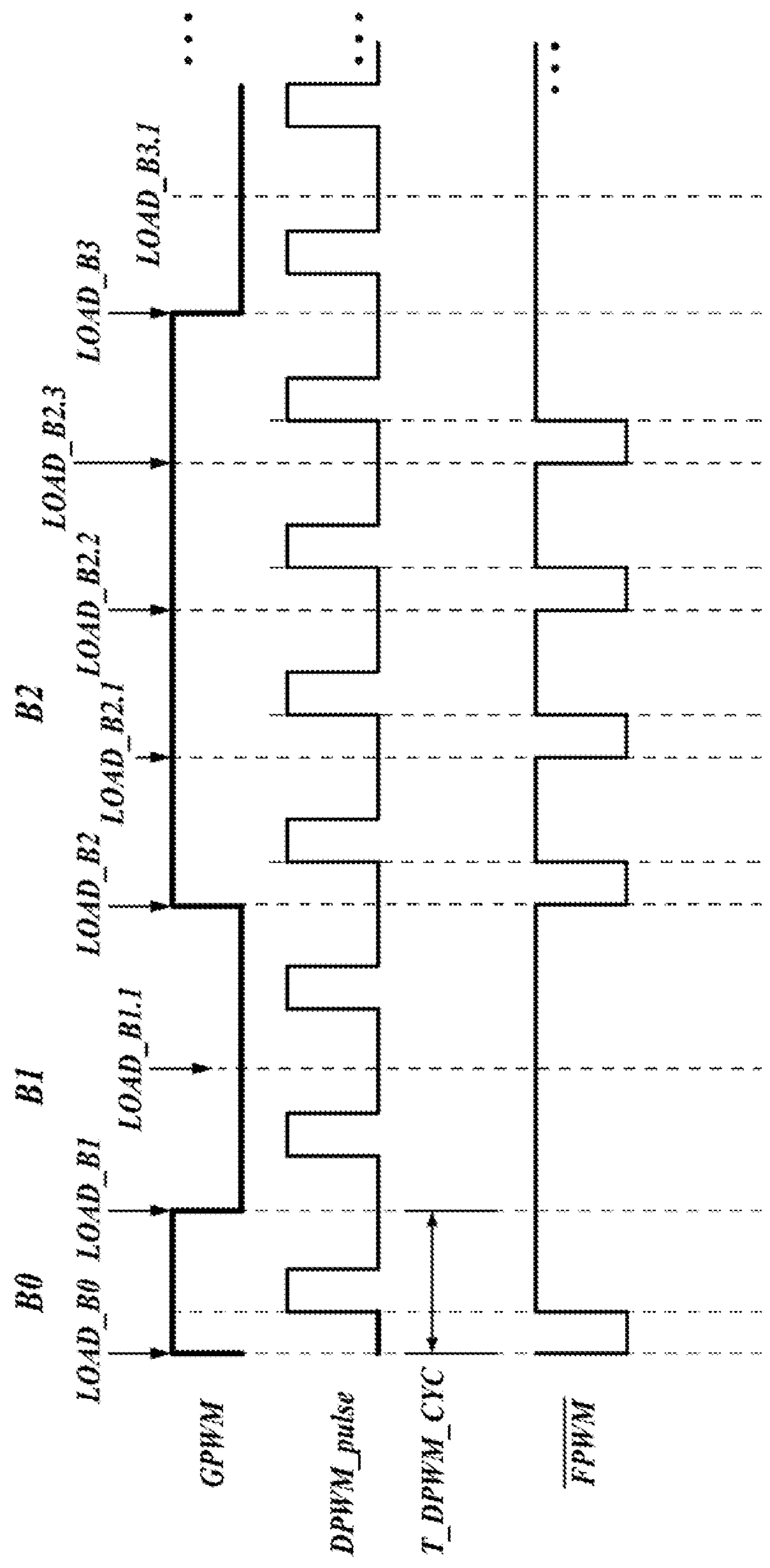
FIG. 3B is a portion of an FPWM signal of the dimming module 360 of FIG. 3A, in accordance with the present technology.

FIG. 3B is a portion of an FPWM signal of the dimming module 360 of FIG. 3A, in accordance with the present technology. In some embodiments, each pixel (such as pixel 304 in FIG. 2A) includes a dimming module 360 (e.g., a logical AND arithmetic module, as shown in FIG. 3A). In some embodiments, the dimming module 360 merges an 8-bit GPWM signal from the bitplane generator with a DPWM signal from the second gate driver. In some embodiments, the DPWM signal is a 10-bit signal.

Example display data for a single pixel (such as pixel 304) in the display panel (such as display panel 330) is 8'b1010_0101. Each bitplane B0, B1, B2, B3 . . . B7 represents a single bit of the display data 8'b1010_0101. It should be understood by one skilled in the art that while only the display data for a single pixel is shown in FIG. 3B, each bitplane B0, B1, B2, B3 . . . B7 includes every pixel in the display panel.

Over time (t), each bitplane B0, B1, B2, B3 . . . B7 transmits display data to the pixel circuit. Each bitplane B0, B1, B2, B3 . . . B7 is loaded during each bit (Load B0, Load B1, Load B2). It should be understood that a bitplane is generated for each bit of the 8-bit display data. FIG. 3B is merely a portion of the full 8-bit display data.

A first bitplane B0 transmits an ON or "1" signal, while the next bitplane B1 transmits an OFF or "0" signal. One skilled in the art will recognize this is just an example of display data 8'b1010_0101. The transmission of ON or OFF depends on the display data of the corresponding pixel. In this manner, the gray value of the pixel for each bit of the 8-bit display data may be transmitted. In this manner, a GPWM signal is transmitted to each pixel, to a dimming module 360 which adjusts a gray value of the pixel.

In some embodiments, the DPWM signal is a series of pulses 350 having a 10-bit resolution. The duty ratio of the DPWM may be from 0% to 100% for dimming. The corresponding dimming value may be from 0 to 1023. In some embodiments, the cycle time of the DPWM is T_B0. In some embodiments, in the same frame time (T_FRAME as shown in FIG. 1E) all pixel circuits share the same DPWM, that is a same duty ratio of DPWM signal. If the next frame has a different duty ratio of the DPWM signal, the different DPWM signal will be updated on a row-by-row basis. In some embodiments, the dimming module 360 uses the DPWM signal to pull down the FPWM.

Figure 3C:
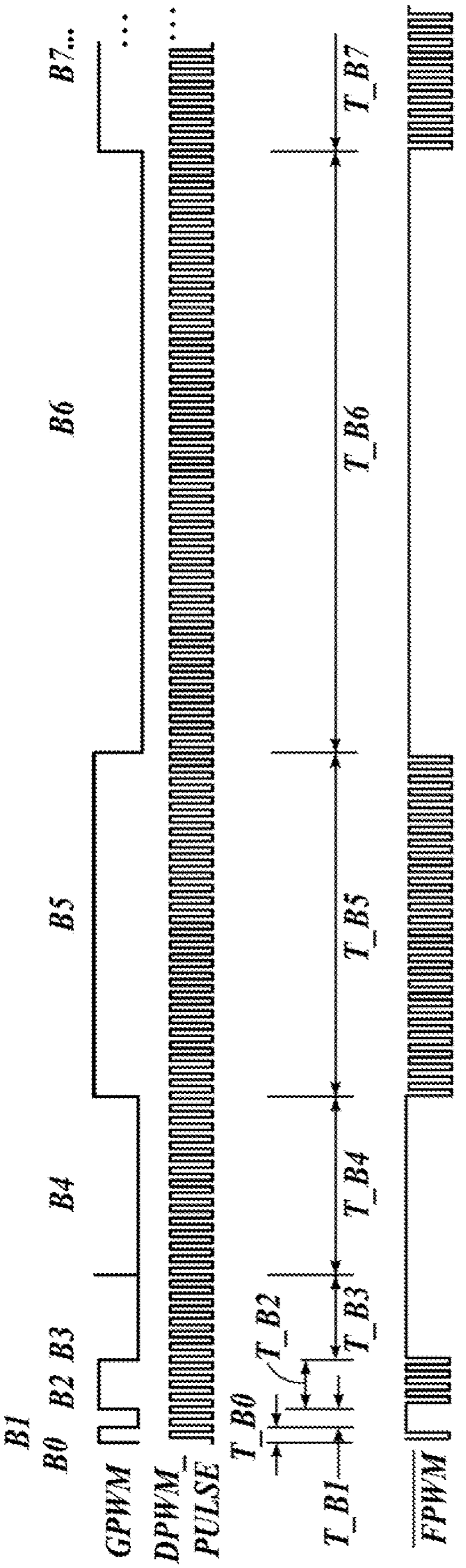
FIG. 3C is the full FPWM signal of FIG. 3B, in accordance with the present technology.

FIG. 3C is the full FPWM signal of FIG. 3B, in accordance with the present technology. In some embodiments, the DPWM is the same for each pixel in a row of the display panel. In some embodiments, the DPWM is a 10-bit signal. In some embodiments, the DPWM. A duty cycle for the DPWM is the same for each pixel in a row of the display panel.

In some embodiments, the GPWM is different for each pixel of the display panel. In some embodiments, display data (or gray scale data) is 8-bit binary number. The bitplane generator generates a bitplane B0, B1, B2, B3, B4, B5, B6, B7 for the entire display panel for each bit of the display data. Each bitplane B0, B1, B2, B3, B4, B5, B6, B7 is generated for each bit (Load_B0, Load_B1, Load_B2, Load_B3, Load_B4, Load_B5, Load_B6, Load_B7).

The dimming module 360 combines the DPWM signal and the GPWM signal to form the FPWM signal. In some embodiments, the FPWM signal is implemented by periodically pulling down the GPWM by the DPWM pulse signal. This embodiment requires to periodically re-write the GPWM signal back to 1-bit storage element. The FPWM signal may then control each pixel in the display panel.

Figure 4:
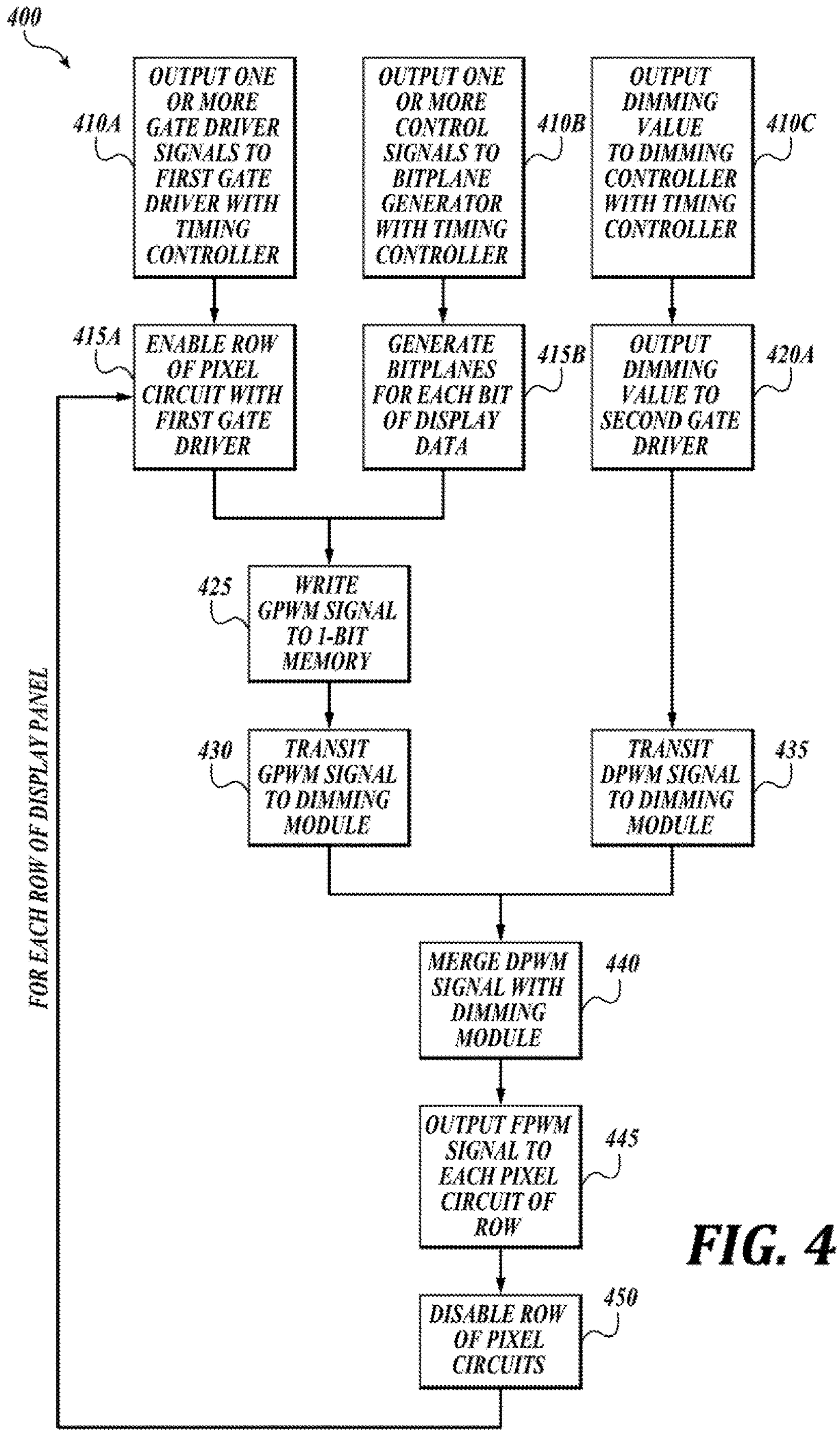
FIG. 4 is an example method 400 of controlling a micro-LED, in accordance with the present technology.

FIG. 4 is an example method 400 of controlling a micro-LED, in accordance with the present technology. In some embodiments, the method 400 may be performed or otherwise carried out with a micro-LED display (such as micro-LED display 300). In some embodiments, the micro-LED display includes a plurality of pixel circuits (such as pixel circuits 304A, 304B, 304C . . . 304N) arranged on a display panel (such as display panel 330). In some embodiments, the micro-LED display includes a timing controller (such as timing controller 307), a frame buffer (such as frame buffer 320), a bitplane generator (such as bitplane generator 325), a first gate driver (such as first gate driver 335A), a dimming controller (such as dimming controller 345), and a second gate driver (such as second gate driver 335B). In some embodiments, the display panel includes first scan lines or wordlines (such as wordlines 340A, 340B, 340C . . . 340N), second scan lines (such as second scan lines 336A, 336B, 336C . . . 336N), and data lines or bitlines (such as bitlines 326A, 326B, 326C . . . 326N) for each pixel in the display panel.

In block 410A, the timing controller outputs one or more control signals (such as control signals CS) to the first gate driver. In some embodiments, the control signals includes a row address, an enablement signal for the row address, a clock signal, or a combination thereof. In some embodiments, these control signals are referred to as "gate driver control signals."

In block 410B, the timing controller outputs one or more control signals (such as control signals CS) to the bitplane generator. In some embodiments, the one or more control signals include a clock signal, an output enable signal, or a combination thereof. In some embodiments, these control signals are referred to as "bitplane control signals."

In block 410C, the timing controller outputs a dimming value to the dimming controller. In some embodiments, the dimming value is the same for every pixel in the row of pixels.

In some embodiments, blocks 410A, 410B, and 410C occur simultaneously or substantially simultaneously.

In block 415A, a row of the display panel is enabled with the first gate driver based on the gate driver control signals. In some embodiments, the row of the display panel is selected with a wordline associated with that row.

In block 415B, the bitplane generator generates a bit plane for every bit in the display data received from the frame buffer.

In some embodiments, blocks 415A and 415B occur substantially simultaneously.

In block 420, the dimming value is transmitted to the second gate driver.

In block 425, the GPWM signal generated by the bitplanes is written to each pixel circuit and stored in a 1-bit memory (such as 1-bit memory 370).

In block 430, the GPWM signal is transmitted to the dimming module.

In block 435, the DPWM signal is transmitted to the dimming module.

In some embodiments, blocks 430 and 435 happen substantially simultaneously.

In block 440, the DPWM and the GPWM signals are merged into an FPWM signal with the dimming module. In some embodiments, the DPWM pulls down the FPWM.

In block 445, the FPWM signal is output to each pixel circuit of the row enabled by the wordline.

In block 450, the row of pixel circuits is disabled by the first gate driver. The method then repeats blocks 415A, 425, 430, 440, 445, and 450 for each row of the display panel. In some embodiments, the method 400 repeats for every frame displayed by the micro-LED display.

What is claimed is:

1. A micro-light-emitting diode (micro-LED) display, comprising:
- a display panel comprising a plurality of pixel circuits arranged in a plurality of rows and columns, wherein each pixel circuit of the display panel includes at least one light-emitting diode (LED);
- a frame buffer configured to store display data of the display panel;
- a first gate driver configured to select a row of the display panel;

a bit plane generator configured to receive the display data from the frame buffer, and generate a plurality of bitplanes and write the display data to each pixel circuit in the row of the display panel, wherein each bitplane corresponds to one bit of the display data and represents a pulse width that corresponds to the one bit of the display data, and wherein the plurality of bitplanes generates a grayscale pulse width modulation (GPWM) signal for each pixel circuit of the display panel in a period of one frame, the GPWM signal being generated as a series of pulses with each pulse having a pulse width that corresponds to a corresponding bitplane of the plurality of bitplanes;

a dimming controller configured to receive a dimming value;

a second gate driver configured to output a dimming pulse width modulation (DPWM) signal to each row of the display panel based on the dimming value, wherein each pixel circuit of the display panel includes a one-bit storage element to serially store the one bit of a respective bitplane and to output the GPWM signal corresponding to the one bit of the respective bitplane, and a dimming module configured to receive the GPWM signal from the one-bit storage element and the DPWM signal from the second gate driver, the dimming module configured to:

merge the GPWM and DPWM signal into a final pulse width modulation (FPWM) signal via an arithmetic logic that includes an AND-type or a NAND-type logic; and output the FPWM signal to adjust a brightness of the pixel circuit at a resolution corresponding to both the resolution of the GPWM signal and the resolution of the DPWM signal.

2. The micro-LED display of claim 1, wherein the AND-type logic comprises an AND gate.

3. The micro-LED display of claim 1, wherein the GPWM signal has an 8-bit resolution.

4. The micro-LED display of claim 1, wherein the DPWM signal has a 10-bit resolution.

5. The micro-LED display of claim 1, further comprising a timing controller configured to:

output one or more gate driver control signals to the first gate driver;

output a dimming value to the dimming controller; and output one or more bitplane control signals to the bitplane generator.

6. The micro-LED display of claim 5, wherein the one or more gate driver control signals include a row address, an enablement signal for the row address, a clock signal, or a combination thereof.

7. The micro-LED display of claim 5, wherein the one or more bitplane control signals include a clock signal, an output enable signal, or a combination thereof.

8. The micro-LED display of claim 1, wherein the DPWM signal and the GPWM signal are controlled by a same clock.

9. The micro-LED display of claim 1, wherein the DPWM signal pulls down the FPWM signal.

10. A method of controlling a micro-light-emitting diode (LED) display, the micro-LED display including display panel, a frame buffer, a bit plane generator, a dimming controller, a first gate driver, a second gate driver, and a dimming module, the method comprising:

storing display data in a frame buffer;

generating a plurality of bitplanes based on display data received from the frame buffer, wherein each bitplane of the plurality of bitplanes corresponds to one bit of the display data and represents a pulse width that corresponds to the one bit of the display data;

enabling a row of the display panel with the first gate driver; and for each pixel circuit of the row of the display panel:

writing a grayscale pulse width modulation (GPWM) signal to each pixel circuit of the row of the display panel based on the plurality of bitplanes, wherein the GPWM signal is distinct for each pixel circuit in the row of the display panel in a period of one frame, the GPWM signal being generated as a series of pulses with each pulse having a pulse width that corresponds to a corresponding bitplane of the plurality of bitplanes;

recieving a dimming value with a dimming controller, wherein the dimming value is a same dimming value for each pixel circuit in the row of the display panel;

serially storing the one bit of a respective bitplane and to output the GPWM signal corresponding to the one bit of the respective bitplane;

writing a dimming pulse width modulation (DPWM) signal to the row of the display panel;

combining the GPWM signal and the DPWM signal with the dimming module to generate a final pulse width modulation (FPWM) signal via arithmetic logic that includes an AND-type or NAND type logic, wherein the dimming module is configured to receive the GPWM signal from the one-bit storage element and the DPWM signal from the second gate driver; and controlling a brightness of a pixel circuit of the display panel based on the FWPM signal at a resolution corresponding to both the resolution of the GPWM signal and the resolution of the DPWM signal.

11. The method of claim 10, wherein the GPWM signal has an 8-bit resolution.

12. The method of claim 10, wherein DPWM signal has a 10-bit resolution.

13. The method of claim 10, wherein the merging the GPWM signal and the DPWM signal further comprises pulling down the FWPM signal with the DPWM signal.

14. The method of claim 10, wherein the micro-LED display further comprises a timing controller, the method further comprising:

outputting one or more gate driver control signals to the first gate driver;

outputting a dimming value to the dimming controller; and outputting one or more bitplane control signals to the bitplane generator.

15. The method of claim 10, wherein the method further comprises:

disabling the row of the display panel with the first gate driver; and enabling a next row of the display panel, until the brightness of every pixel circuit in the display panel has been adjusted.

16. The method of claim 15, wherein the brightness of every pixel circuit in the display panel is adjusted within one frame of a plurality of frames displayed by the display panel.

17. The method of claim 16, wherein the method is repeated for each frame of the plurality of frames.

* * * * *